United States Patent
Michaels

(10) Patent No.: US 8,566,952 B1
(45) Date of Patent: Oct. 22, 2013

(54) SYSTEM AND METHOD FOR ENCRYPTING DATA AND PROVIDING CONTROLLED ACCESS TO ENCRYPTED DATA WITH LIMITED ADDITIONAL ACCESS

(75) Inventor: David Michaels, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 688 days.

(21) Appl. No.: 12/655,215

(22) Filed: Dec. 24, 2009

(51) Int. Cl.
*G06F 7/04* (2006.01)

(52) U.S. Cl.
USPC .............................................. 726/27; 726/30

(58) Field of Classification Search
USPC ............... 713/150, 164–168, 176; 726/26–31
See application file for complete search history.

(56) References Cited

U.S. PATENT DOCUMENTS

| | | | | |
|---|---|---|---|---|
| 5,787,169 A * | 7/1998 | Eldridge et al. | ............... | 713/165 |
| 6,381,698 B1 * | 4/2002 | Devanbu et al. | ............... | 713/170 |
| 7,373,521 B1 * | 5/2008 | Kawahara | ...................... | 713/193 |
| 7,603,553 B1 * | 10/2009 | Corbett et al. | ................. | 713/165 |
| 2001/0049786 A1 * | 12/2001 | Harrison et al. | .............. | 713/156 |
| 2002/0012432 A1 * | 1/2002 | England et al. | ................ | 380/231 |
| 2002/0018566 A1 * | 2/2002 | Kawatsura et al. | ........... | 380/232 |
| 2002/0077988 A1 * | 6/2002 | Sasaki et al. | ..................... | 705/59 |
| 2002/0107806 A1 * | 8/2002 | Higashi et al. | .................. | 705/51 |
| 2002/0169974 A1 * | 11/2002 | McKune | ....................... | 713/200 |
| 2004/0054678 A1 * | 3/2004 | Okamoto et al. | ............. | 707/100 |
| 2004/0078338 A1 * | 4/2004 | Ohta et al. | ........................ | 705/51 |
| 2004/0193546 A1 * | 9/2004 | Tokutani et al. | ................. | 705/59 |
| 2005/0039022 A1 * | 2/2005 | Venkatesan et al. | .......... | 713/176 |
| 2005/0097368 A1 * | 5/2005 | Peinado et al. | ................ | 713/201 |
| 2005/0235361 A1 * | 10/2005 | Alkove et al. | .................... | 726/27 |
| 2005/0283496 A1 * | 12/2005 | Carpentier et al. | ........ | 707/103 R |
| 2006/0059104 A1 * | 3/2006 | Ebihara et al. | .................. | 705/59 |
| 2006/0107330 A1 * | 5/2006 | Ben-Yaacov et al. | ........... | 726/26 |
| 2007/0079382 A1 * | 4/2007 | Celikkan et al. | ................ | 726/26 |
| 2009/0151006 A1 * | 6/2009 | Saeki et al. | ...................... | 726/28 |

* cited by examiner

*Primary Examiner* — Darren B Schwartz
(74) *Attorney, Agent, or Firm* — Park, Vaughan, Fleming & Dowler LLP

(57) ABSTRACT

A system and method allows signed permissions to be used to decrypt data. Unsigned permissions may also be used to decrypt data up to a limit.

15 Claims, 5 Drawing Sheets

SYSTEM AND METHOD FOR ENCRYPTING DATA AND PROVIDING CONTROLLED ACCESS TO ENCRYPTED DATA WITH LIMITED ADDITIONAL ACCESS

FIELD OF THE INVENTION

The present invention is related to computer software and more specifically to encryption software.

BACKGROUND OF THE INVENTION

Data may be stored encrypted. Various protocols, such as the conventional Kerberos protocol may be employed in the storage of encrypted data. It may be desirable to allow access to decrypt data via a permission that is granted from one or more locations or parties that are different from the location and/or party storing the data. This provides a more secure arrangement for the data than if permission and access is granted by the same location and party storing the data, because theft of the data would require access to multiple locations or would require involvement by different parties.

However, there is a problem with this approach. If the permission is granted electronically, there may be problems in obtaining the permission or communicating it to the computer system that uses the permission to decrypt the encrypted data. Such problems may be network related or computer system related.

SUMMARY OF INVENTION

After a request to decrypt data is received, a system and method looks to see if a permission object received with the request is signed by a permission granting authority or a sufficient number of them.

If the request is signed or signed by a sufficient number of permission granting authorities, the permission is checked to see if it is expired or not valid. If so, the request is denied. If the permission is not expired and not invalid, an authorized master key may be used to decrypt a session key that was previously used to encrypt the data, and is stored associated with that data, along with a fingerprint of the decrypted data. The fingerprint is compared with a fingerprint received in the permission object. If the two fingerprints match, the data is decrypted and provided, for example, over a network, and the decryption is not counted against a shock absorption limit.

If the permission is not signed, or is not signed by a sufficient number of permission granting authorities, an authorized master key is used to decrypt the session key and fingerprint stored with the decrypted data, and again the decrypted fingerprint is compared with the fingerprint in the unsigned permission object. If the fingerprints match, a shock absorption limit counter for the corresponding master key is incremented and stored and compared with a maximum. If the counter is not greater than the maximum, the data is decrypted and otherwise, an error is returned and the data is not decrypted.

In this fashion, a number of requests may be authorized to decrypt data, even if the request was not signed, until the shock absorption limit is reached for the master key and optionally, a permission granting key that corresponds to one or more (e.g. a quorum of) signed-in operators.

Encryption of data may be performed by identifying a master key to use, generating or identifying a session key, receiving the data, generating or identifying a fingerprint for that data, encrypting the data with the session key, encrypting the session key identified and the fingerprint with the master key, storing the encrypted data, with the encrypted session key and fingerprint, indexed using an identifier that is received with the data or generated, providing the fingerprint and optionally providing the identifier of the data and an identifier of the master key. The session key may be changed from time to time, may be different for each piece of data, or may be re-used in any way.

DETAILED DESCRIPTION OF A PREFERRED EMBODIMENT

Figure 1:
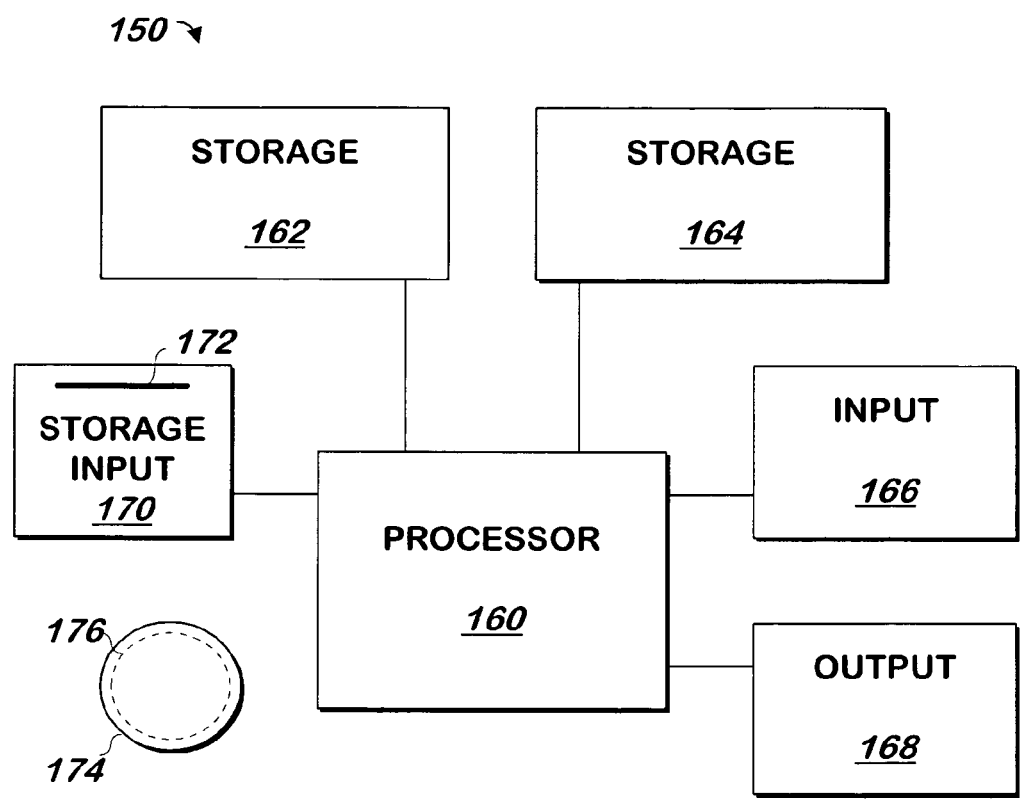
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used.

Receipt of Keys and Operator Cards.

Figure 2A:
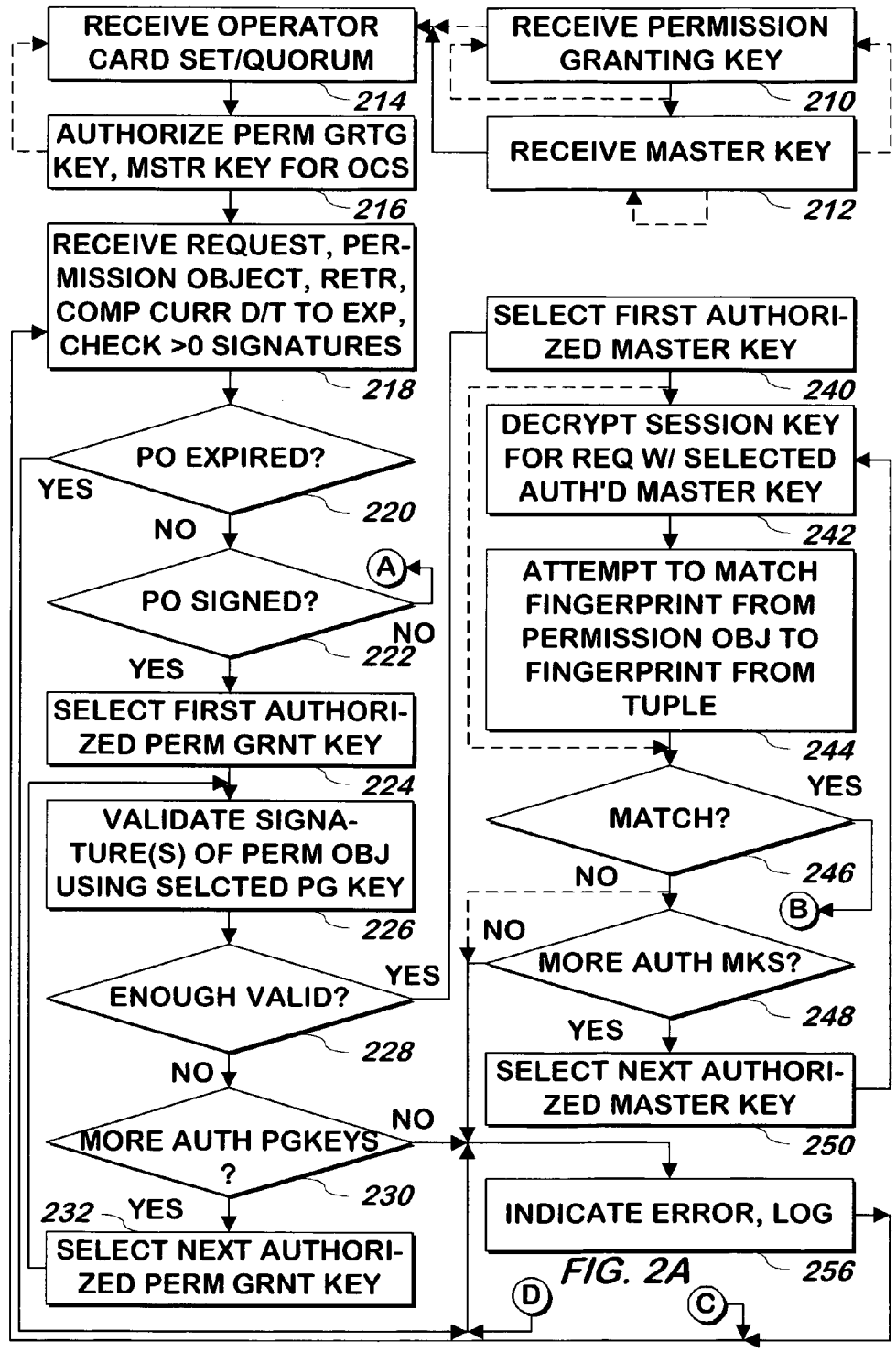
FIGS. 2A and 2B is a flowchart illustrating a method of encrypting, storing, decrypting and providing data over a network according to one embodiment of the present invention.
Figure 2B:
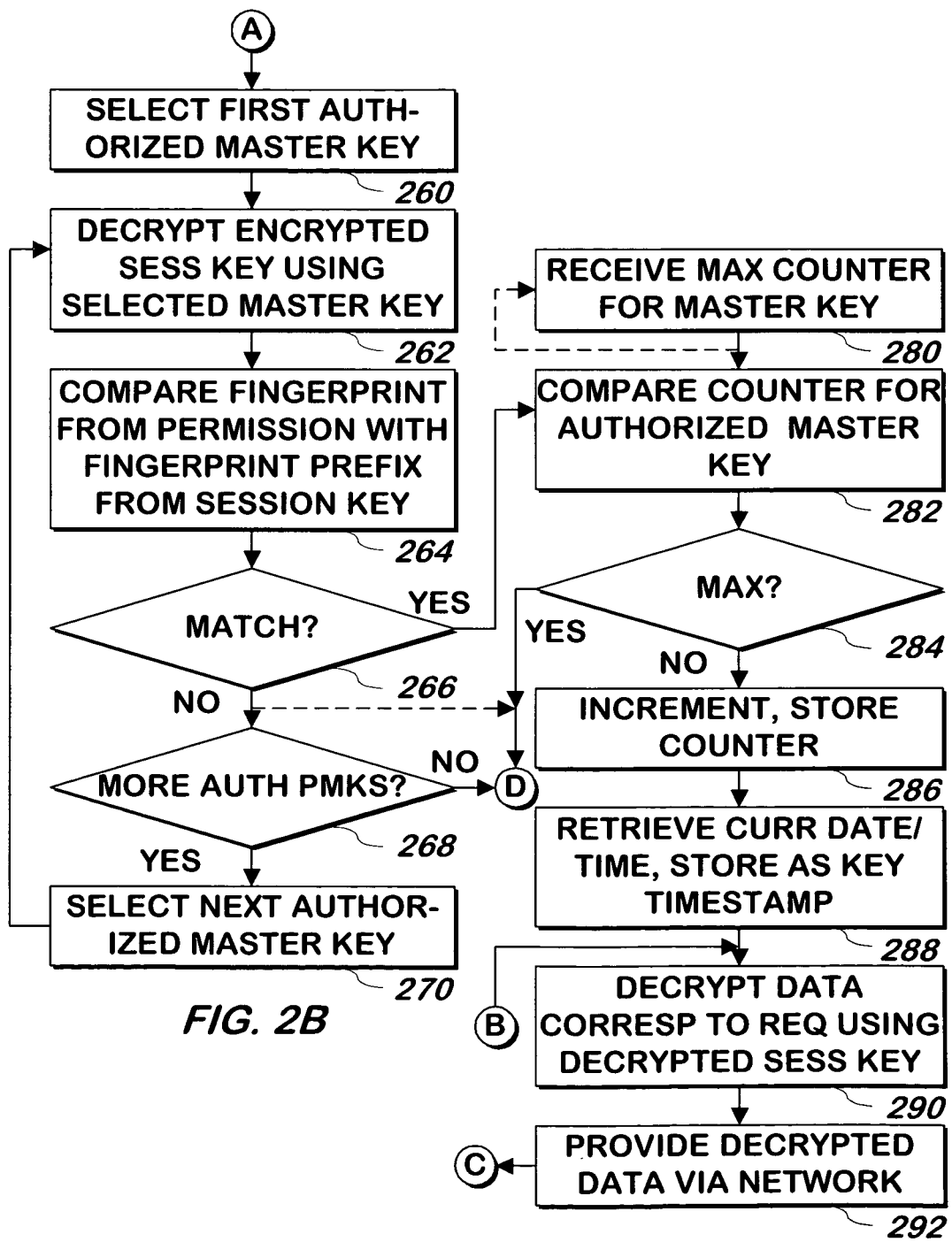

FIGS. 2A and 2B are a flowchart illustrating a method of providing data over a network according to one embodiment of the present invention. Referring now to FIGS. 2A and 2B, one or more permission granting keys and one or more master keys are received 210, 212. In one embodiment, each permission granting key is associated with one master key, in a one-to-one, many-to-one or many to many relationship. That is, a permission granting key may be associated with one master key or several master keys, and a master key may be associated with one or more permission granting keys. The receipt of the keys may occur as individually (for each type of key), separately running processes as indicated by the dashed lines in the Figure underneath each of steps 210 and 212, or may occur as a single separately running process for both keys as indicated in the Figure by the dashed line to the right of steps 210 and 212. In one embodiment, each permission granting key and master key are any conventional cryptographic key, though, in one embodiment, each permission granting key is a public key of a public key cryptographic key pair and each master key is the private key of a public key cryptographic key pair.

An operator card is, or a quorum of operator cards are, received 214. In one embodiment, an operator card is one or more physical devices that, when inserted into, or swiped through, a reader, authorizes one of the master keys and one of the permission granting keys received as described above, though other numbers of either key may be authorized by an operator card, and other forms of operator cards may be used. For example, in one embodiment, an operator card authorizes one master key and multiple permission granting keys. In one embodiment, an operator card may be a text message received at the operator's cell phone that is generated by a computer system to verify that the user has the cell phone, or a fingerprint or voiceprint. In one embodiment, an operator card may be other forms of authentication, such as a username and a password.

In one embodiment, multiple operator cards are required to authorize the keys described above. In one embodiment, certain operator cards will contribute to a quorum for any set of such keys, with other card sets not counting towards that quorum. For example, each operator card may be associated to a certain set of keys, but the set of keys is not authorized until other operator cards also associated with that same set of keys is received. Operator cards may be associated with one or more than one sets of keys. In still another embodiment, an operator card may be associated with a set of keys, but at least N (N>=1) other operator cards, whether or not associated with the same set of keys, constitute the quorum.

Any number of operator cards may be received, and any unauthorized master keys or permission granting keys received as described above may be authorized in this fashion.

In one embodiment, each time a key is authorized, it remains authorized until every card set that authorized that key is received with an indication that the operator card is being received to log it out. In another embodiment, a key is authorized for an amount of time from the last time it was authorized via an operator card. In other embodiments, receipt of an operator card removes all prior authorizations of keys and remains valid until logged out or another operator card is received.

In one embodiment, such as if a quorum is required, operator cards may be logged out with or without the actual operator card. For example, an indication may be received to log out an operator card. Operator cards may expire and be automatically logged out a certain amount of time after they have been logged in. Each time an operator card is logged out, if the quorum of operator cards required to authorize a set of keys as described above is not logged in, the set of keys will no longer be authorized.

Receipt of Permission Object.

A request, and a permission object is received 218. In one embodiment, a request has a specification of the data being requested, such as an identifier of the data. A permission object has zero or more signatures, an expiration date and time for that permission object, and a fingerprint of the data being requested. Each of these are described in more detail below.

In one embodiment, as part of step 218, the current date and time is retrieved for example, from a system clock or a trustworthy clock, for example, one whose time cannot be altered by a malicious entity, and compared with the expiration date and time of the permission object. Additionally, as part of step 218, a check is made to determine if the permission object has at least one signature, or a minimum required number of signatures.

If the expiration date and time of the permission object is prior to current date and time 220, the permission object is expired, and an error (and its type) is indicated and optionally logged 256 and the method continues at step 218.

If the permission object is not expired as described above 220, the method continues at step 222. If the permission object does not contain at least one signature (or a minimum number of signatures) 222, the method continues at step 260 of FIG. 2B. If the permission object has at least one signature (or a minimum number of signatures) 222, the method continues at step 224.

Permission Object Signed—Attempt to Validate Signature(s).

In one embodiment, the party initiating the request will have previously provided (e.g. via a network, such as the Internet) the request and the unsigned permission object to a third party that is different from the party maintaining the encrypted data. The third party may be located in a different location than the party maintaining the encrypted data as well. If the third party determines that the request is valid, the third party logs the request (including the date and time, identifier of the requestor, and some or all of the request itself), signs the permission object e.g. using a private key corresponding to one of the permission granting keys) and returns it to the requestor.

Although the permission object is described herein as being generated by the requestor and signed by the third party, in one embodiment, the requestor may provide the request without the permission object, but with sufficient information to allow the third party to build the permission object. Such information may include a time of day, which the requestor may provide to all third parties to which it makes the request. In the embodiment in which the third party builds the permission object, the third party builds and signs the permission object and returns it to the requestor if it determines that the request is valid as described herein.

In one embodiment, the third party determines that any request that can be identified and logged is valid. In another embodiment, a username and password, or digital signatures, is used to authenticate the request, or the source of the request may be used to authenticate the request, and any authenticated request is considered valid by the third party.

There may be more than one third party that can be authorized to sign a permission object. In this case, the party making the request may send the request and permission object to one such third party for its signature, or to more than one such third party and receive multiple signatures. For example, if there are two such third parties, the party making the request may send it to both of them. Or if there are three such third parties, the party making the request may send it to two of them, and if they each provide a signed permission object, the party need not use the last of the third parties, though if one of the first two does not respond, the party making the request may send the request to the last of the third parties. The party making the request can then append the signature or signatures to the retained permission object prior to sending it, for reception as part of step 218. In one embodiment, the third parties are physically remote, and independent, from the party making the request and from the party implementing some or all of the steps of FIGS. 2A and 2B (who may be the same as the party making the request), and so communication among them is made via a network. If the network is interrupted, or the computer systems of a third party are not operational, the signature of that third party will be unavailable.

At step 224, a first authorized permission granting key is selected. Any signature of the permission object is validated using the selected authorized permission granting key. In one embodiment, to validate a signature, the permission object (except for the signature or signatures) is hashed using a same conventional cryptographic hash function that was used to produce the signature or signatures, and using the selected permission granting key. If the hash result matches the signature, then the same key and hash technique was used by the third party that provided the signature and so the signature is considered valid. Other conventional cryptographic means of signature validation, such as public key cryptography techniques, may be used.

If there is more than one signature, an attempt to validate every nonvalidated signature may be made using the selected permission granting key as described above. If one is validated, then it is counted as being valid.

If a sufficient number of signatures have been determined to be valid 228, such as one or two or more, the request is considered to have sufficient permission to be decrypted, and so the method continues at step 240 and otherwise 228, if there are more authorized permission granting keys (and optionally, more not yet validated signatures in the permission object) 230, the next authorized permission granting key is selected 232 and the method continues at step 226 using the newly selected authorized permission granting key.

If at step 230, there are no more authorized permission granting keys (or, in one embodiment, there are no more not yet validated signatures in the permission object), the method continues at step 256 as described above. In this case, the request does not have sufficient permission to be decrypted.

In one embodiment, the "no" branch of step 230 is followed by step 260. In this embodiment, an insufficient number of signatures matching an authorized signature will cause step 260 to be the next step rather than step 256.

Sufficient Signature(s) Valid, Attempt to Find Master Key and Match Fingerprint

At step 240, a first authorized master key is selected 240 and an encrypted tuple containing the session key used to encrypt the requested data and a cryptographic or other fingerprint, (the encrypted tuple having been stored associated with the encrypted data,) is decrypted 242 using the selected authorized master key. One embodiment of the fingerprint is described in more detail below. If the selected authorized master key is a public/private key pair, the private key is used to decrypt the tuple. An attempt is made to match the fingerprint in the request from the decrypted fingerprint in the tuple 244. If the attempt succeeds (i.e. the fingerprints match) 246, the method continues at step 290 of FIG. 2B. Otherwise 246, if there are more authorized master keys 248, the next authorized master key is selected 250 and the method continues at step 242 using the newly selected authorized master key. Any or all of steps 240-250 may be performed in a conventional hardware security module, which is highly secure. If there are no more authorized master keys 248, the method continues at step 256, as described above. As used herein, any "copy" of a fingerprint, in encrypted form or cleartext form, is referred to as a "version of the fingerprint".

Master Key May be Specified in the Permission Object.

In one embodiment, the master key to be used is specified by the permission object. In such embodiment, the specified master key is the one selected in step 240 if it is authorized, and if it is not authorized, the method continues at step 256.

In one embodiment, steps 242 and 244 are used even though the master key is specified, and the no branch of step 246 is followed by step 256, as indicated by the dashed line in the Figure. Steps 248-250 are not used in such embodiment.

No Signature.

Identify Master Key.

As noted above, if the permission object is unsigned or unsigned by any authorized permission granting key or, in one embodiment, not signed by a sufficient number of authorized permission granting keys 222, the method continues at step 260 of FIG. 2B.

At step 260, a first authorized master key is selected. The tuple containing the session key that was used to encrypt the specified data and the fingerprint and is stored associated with the encrypted data is decrypted 262 using the selected authorized master key. The decrypted fingerprint from the tuple is compared with the fingerprint from the permission object 264 and if these fingerprints match 266, the method continues at step 282.

Otherwise 266, if there are more authorized master keys 268, the next authorized master key is selected 270 and the method continues at step 262 using the newly selected authorized master key. If there are no additional authorized master keys 268, the method continues at step 256 of FIG. 2A as described above.

In the same manner as described above, the master key may be specified by the permission object. In such embodiment, the master key specified may be the first master key selected in step 260 if the specified master key is authorized. If the specified master key is not authorized, the method continues at step 256 of FIG. 2A. In such embodiment, step 256 of FIG. 2A follows the no branch of step 266 (as indicated by the dashed line in the Figure), and steps 268 and 270 are not used.

Check Counter.

Once the master key is identified as described above, a counter and maximum are obtained 282 that correspond to the most recently identified authorized master key.

The maximum for a master key may be specified or increased at any time as part of an independently running process shown as step 280 in the Figure. The counter itself may be decreased in one embodiment. In one embodiment, such specification, increase or decrease is allowed only when the party performing such action is authenticated as having permission for such purpose using conventional authentication techniques, for example having been signed by one of the third parties using any permission granting key or the permission granting key corresponding to the counter. Such signature may be performed in response to a request, which is logged and/or communicated to other parties to ensure that it was not being improperly granted.

If the counter for the master key is at or above the maximum 284, the method continues at step 256 of FIG. 2A. Otherwise 284, the counter for that master key is incremented and stored 286 in place of the prior value of the counter and the current date and time is retrieved and stored in place of (or appended to a circular buffer for) the prior date and time associated with that master key 288 and the method continues at step 290.

Decrypt Requested Data.

At step 290, the requested data is decrypted using the decrypted session key and the decrypted data is provided 292 via a network. In one embodiment, the encrypted data is stored in a secure device such as the conventional nCipher nForce or nFast product commercially available from Thales e-Security, Inc. of Milpitas, Calif. The secure device performs some or all of the steps of FIGS. 2A and 2B from inside a secure platform, and from which unauthorized access is restricted. It receives the data, decrypts it, controls access to it, and provides the decrypted data via a network (and/or optionally to a host computer) as described herein.

Encryption.

Figure 3:
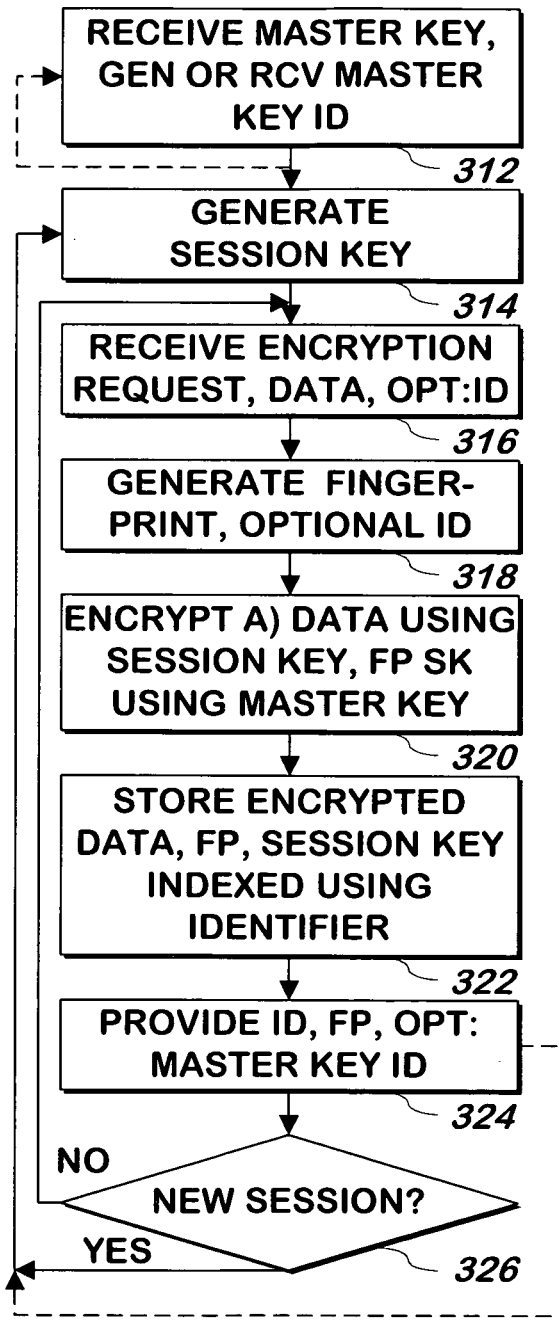
FIG. 3 is a flowchart illustrating a method of encrypting data according to one embodiment of the present invention.

Referring now to FIG. 3, a method of encrypting data for use, for example, with the method of FIG. 2 is shown according to one embodiment of the present invention.

A master key is received 312. In one embodiment, the master key is the public key of the public key/private key pair described above. An identifier may be received with the master key or it may be generated for each master key received. In one embodiment, receiving a master key includes generating the master key using conventional public key cryptography techniques. In one embodiment, step 312 is performed as part of an independently running process as indicated by the dashed line in the Figure, allowing a master key to be received at any time. Any number of master keys may be received.

A session key is generated 314. The session key may be a symmetric key in one embodiment, though other types of session keys may be used. In one embodiment, a session key is a random or pseudo-random number.

A request to encrypt data is received 316. In one embodiment, the request includes the data, and may optionally include an identifier to use to index the encrypted data and optionally an identifier of the master key to use. Information to be contained in the fingerprint as described below may be received with the request as part of step 316.

A fingerprint of the data received with the request is generated 318, for example, using any conventional hash function and a hash key. The hash key may be selected with the session key, or it may be pseudo randomly or randomly generated each time data is received, or at other times. The hash key may be stored as part of step 318.

A conventional cryptographic fingerprint need not be used as the fingerprint, as other fingerprints may be used. As used herein, a "fingerprint" is set of one or more codes that is based on the data and has a low or no probability of being replicated when a second fingerprint is generated from different data. In one embodiment a fingerprint is a group of information, consisting of: a unique user identifier, a type code corresponding to the type of the data, a timestamp for when the fingerprint was generated. and a serial number, incremented by one for each fingerprint generated. This allows each fingerprint to be unique and to also store and convey information. The fingerprint may or may not be encrypted. The user identifier and type code may be received as part of the request at step 316.

The data is encrypted using the session key generated as described above, and the fingerprint and session key are encrypted using the master key 320. The master key may be the master key most recently authorized by an operator card or one specified in step 316. If the master key is a public/private key pair, the public key may be used to encrypt the fingerprint and session key.

The encrypted data, and the encrypted fingerprint and session key are stored 320, indexed using the identifier. The fingerprint is provided 322, optionally with the identifier and optionally with an identifier of the master key, which may be the public key of the master key itself.

If a new session has begun 324, the method continues at step 316, and otherwise, the method continues at step 314. In one embodiment, a new session begins when an operator card is received, at midnight each night, on the hour or at random times throughout the day. In one embodiment, step 314 follows step 324 unconditionally, as indicated by the dashed line in the Figure, and step 326 is not used.

System.

Figure 4:
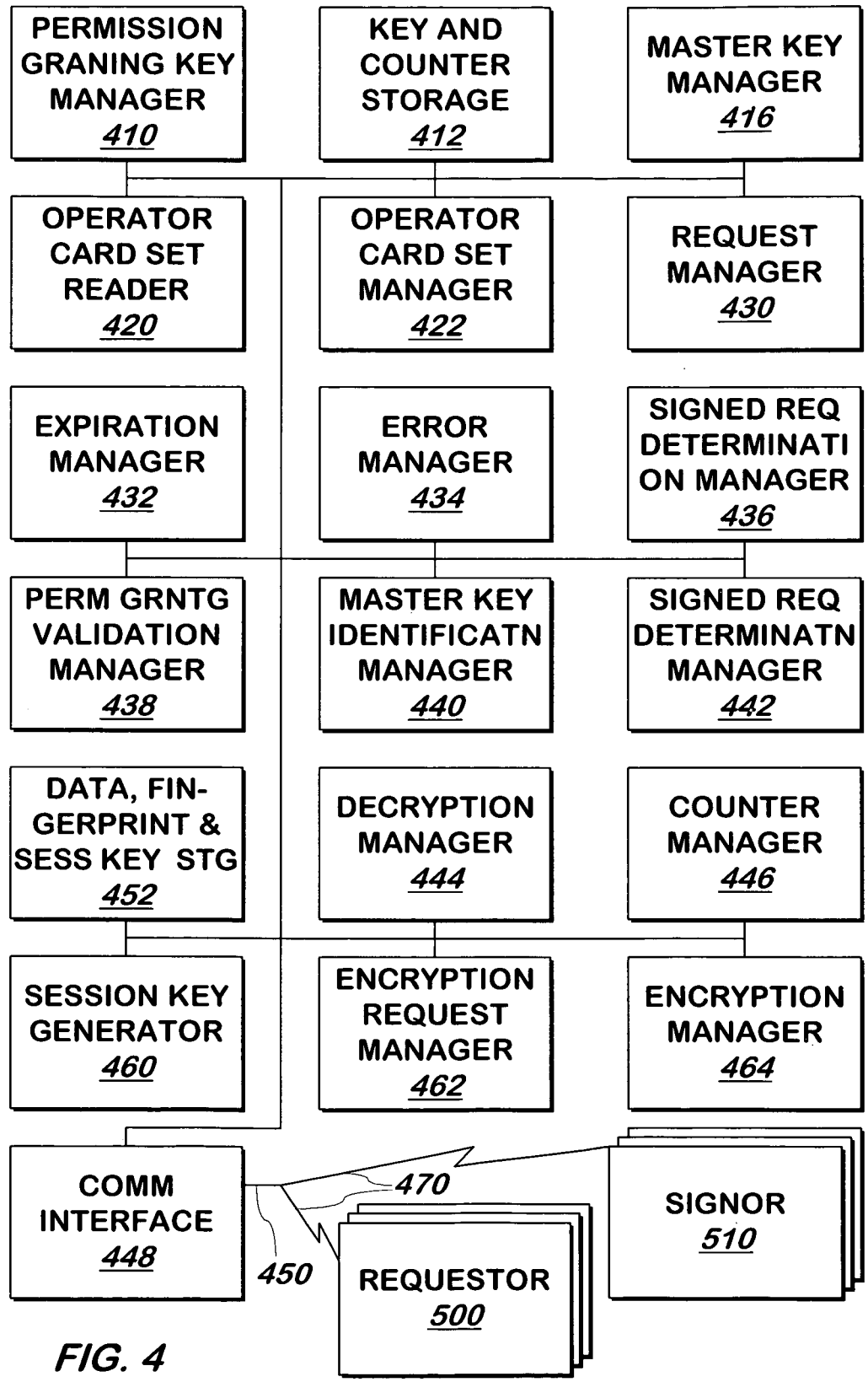
FIG. 4 is a block schematic diagram of a system for encrypting, storing, decrypting and providing data over a network according to one embodiment of the present invention.

FIG. 4 is a block schematic diagram of a data protection system 400 for storing, decrypting and providing data over a computer network, three requestors 500 and three signors 510 according to one embodiment of the present invention.

Communication Interface.

Communication interface 448 is a conventional communication interface, including a conventional Ethernet interface running conventional communication protocols, such as Ethernet and TCP/IP. Communication interface 448 is coupled via input/output 450 to a computer network, such as a conventional Ethernet network and/or the Internet. Unless otherwise specified, all communication into or out of data protection system 400 of FIG. 4 is made via input/output 450 of communication interface 448.

Key Management and Operator Card Management.

Permission granting key manager 410 receives permission granting keys as described above. In one embodiment, some or all of the received permission granting key matches or corresponds to a permission granting key that will be used to sign permission objects. In one embodiment, permission granting key manager 410 receives the public key of a key pair, the private key of which is retained by the third party, and used to generate or encrypt a hash result of the permission object for use as a signature. In one embodiment, the permission granting key also specifies the signature method, so that different signatures may be signed using different techniques. Permission granting key manager 410 stores each permission granting key it receives into key and counter storage 412.

Master key manager 416 receives or generates, for example, when requested by a sufficiently authenticated (using conventional authentication techniques) system administrator, master keys as described above and stores the master keys it receives or generates into key and counter storage 412.

Operator card reader 420 is a conventional input device, such as a keyboard of USB and/or magnetic card reader that reads an operator card comprising, for example, one or more USB tokens and/or magnetic cards using conventional techniques. When it reads such information, operator card reader 420 provides the information to operator card manager 422, which uses conventional authentication techniques to authenticate the user. In one embodiment, some of the information thus received may be signed, for example, using a symmetric key or private that operator card manager 422 stores in key and counter storage 412 and are to be considered as corresponding to that operator card. The information may include identifiers of one or more of the master keys and one or more of the permission granting keys that are stored in key and counter storage 412. In one embodiment, the operator card includes an identifier which is stored in key and counter storage 412, associated with one or more master keys and one or more permission granting keys as described above.

In one embodiment, a sufficiently authenticated system administrator may instruct operator card manager 422 to write this information and a signature onto one or more USB tokens and/or one or more magnetic cards, so that they may be used as described above.

At the time the operator card is read, if the information is authenticated, for example by re-signing some of the information received and comparing it to a signature received from the operator card, operator card manager 422 indicates in key and counter storage 412 that the one or more permission granting keys and one or more master keys corresponding to the operator card are authorized.

In one embodiment, such keys are authorized by card set manager 422 only when a quorum of operator cards are logged in as described above. Card set manager 422 monitors the quorum status for each key and indicates in key and counter storage 412 that they are authorized or not authorized them as quorum requirements are met or not met.

In one embodiment, card set manager 422 retrieves, as described above, the current date and time and stores it associated with the indicated keys in key and counter storage 412, optionally replacing any date and time stored associated with such keys, and in another embodiment, stores associated with each such indicated key a unique identifier it stored on the operator card when it wrote it as described above, either in place of, or in addition to, identifiers already associated with any such keys. Such information indicates that the key is authorized, until an amount of time after the date and time stored, or until the user, optionally using operator card manager 422 and optionally, the operator card reader 420, logs the operator card out, at which point, operator card manager 422 removes in key and counter storage the card set identifier from any key with which that operator card identifier has been associated. As noted above, in one embodiment, when one operator card is read, all other operator cards are automatically treated as though such operator card are logged out by operator card manager 422.

In one embodiment, permission granting keys, master keys and/or operator cards may be received as described above at any time as described above.

Decryption.

At any time, a request for data, including a permission object generated as described above (including logging the request by the third party or parties) may be received as described above. When such a request is received, communication interface 448 forwards the request and the source IP address, source port and optionally the protocol to request manager 430.

When it receives the request, request manager 430 forwards the expiration date and time from the permission object to expiration manager 432, which retrieves the current date and time from a trustworthy clock and indicates to request manager 430 whether the current date and time is not after the expiration date and time. If the indication is false (e.g., the permission object is expired), request manager 430 provides the request, the IP address, port and protocol of the sender of the request, and an indication of the error (in this case, that the permission is expired) to error manager 434, which sends an explanation of the error (which it retrieves internally using the indication of the error) to the IP address, and port, using the protocol corresponding to the request. If the indication received from expiration manager 432 is true, request manager 430 sends the request to signed request determination manager 436.

When it receives the request, signed request determination manager 436 determines if the request is sufficiently signed. In one embodiment, any signatures, if present, follow a delimiter in the request. If there are no signatures following the delimiter, signed request determination manager 436 determines that the permission object is not sufficiently signed, and otherwise, determines that the permission object is sufficiently signed. Signed request determination manager 436 provides to request manager 430 an indication of the determination it makes. In one embodiment, signed request determination manager 436 may determine the permission object is sufficiently signed if it has a requisite number of signatures and sufficiently signed if it does not.

Request is Signed.

If the indication received from signed request determination manager 436 is that the request is sufficiently signed, request manager 430 provides the request and the signatures to permission granting validation manager 438. Permission granting validation manager 438 uses the authorized permission granting keys in key and counter storage to determine whether the permission object is signed by a sufficient number signatures corresponding to authorized permission granting keys as described above, for example, in steps 224-232. Permission granting validation manager 438 provides to request manager 430 an indication of whether the permission object is signed by a sufficient number of authorized permission granting keys as described above, and, optionally, an identifier of the permission granting key corresponding to the signatures, or a selected one of the signatures as described above.

If the indication is that the permission object is not sufficiently signed, request manager 430 provides the IP address, port and protocol it received, and an indication that the permission object is not signed by a sufficient number of authorized permission granting keys to error manager 434, which describes the error to the device that sent the request containing the permission object.

If the indication is that the permission object is signed by a sufficient number of permission granting keys, request manager 430 provides the specification of the data in the request (e.g. the identifier that was used to store the data as described herein), and the fingerprint, to master key identification manager 440.

When it receives such information, master key identification manager 440 uses the specification to locate the encrypted signature and fingerprint, and uses the fingerprint to identify which of the authorized master keys in key and counter storage 412 was used to encrypt the fingerprint and session key stored with the data as described above (including checking that the cryptographic or non-cryptographic fingerprints match, as described above). If an authorized master key is identified, master key identification manager 440 will also decrypt the session key as part of that process. Master key identification manager 440 provides to request manager 430 an identifier of the authorized master key that was used to encrypt the session key and fingerprint, and the decrypted session key; or an indication that no authorized master key was used to encrypt the session key and fingerprint stored with the data. In one embodiment, an identifier of the master key is included as part of the request, and request manager 430 provides the identifier of the master key to master key identification manager 440, which attempts to validate only the identified master key as described above.

When it receives such indication or decrypted session key, if it is an indication that no authorized master key was used to encrypt the session key and fingerprint stored with the data, request manager 430 provides the IP address, port and protocol it received, and an indication that no authorized master key may be used to encrypt the session key to error manager 434, which describes the error to the device that sent the request containing the permission object as described above.

If it receives from master key identification manager 440 a session key and master key identifier, request manager 430 provides the specification from the request and the decrypted session key it received to decryption manager 444, which decrypts the data corresponding to the specification in data, fingerprint and session key storage 452 using the decrypted session key, and provides the data to request manager 430. Request manager 430 uses the IP address and port and protocol to build a response containing the decrypted data, and provides it to the device that sent the request via input/output 450 of communication interface 448. If desired, the decrypted data may be encrypted by request manager using the public key of a public key pair for which the recipient has the private key, and in such embodiment, the encrypted data is sent as part of the response instead of the decrypted data. The public key may be sent as part of the request by the requestor. In one embodiment, each request contains an identifier of the request, and the identifier is included with the response.

Request Not Signed.

If the indication from signed request determination manager 436 is that the request is not sufficiently signed as described above, request manager 430 provides the specification of the data in the request, and the fingerprint, to master key identification manager 440.

When it receives such information, master key identification manager 440 uses the fingerprint to identify which of the authorized master keys in key and counter storage 412 was used to encrypt the fingerprint and session key stored with the data as described above, with reference to steps 240-250, and if an authorized master key is identified, it will also decrypt the session key as part of that process. Master key identification manager 440 provides to request manager 430 an identifier of the authorized master key that was used to encrypt the session key and fingerprint, the decrypted session key or an indication that no authorized master key was used to encrypt the session key and fingerprint stored with the data. In one embodiment, the request may contain the identifier of the master key, which request manager 430 provides to master key identification manager 440 for use as described above.

When it receives such master key identifier and indication or decrypted session key, if it is an indication that no authorized master key was used to encrypt the session key and fingerprint stored with the data, request manager 430 provides the IP address, port and protocol it received, and an indication that no authorized master key may be used to encrypt the session key to error manager 434, which describes the error to the device that sent the request containing the permission object as described above.

If it receives from master key identification manager 440 a master key identifier and a session key, request manager 430 provides to counter manager 446 the identifier of the master key it receives.

When it receives the identifiers of the key from request manager 430, counter manager 446 retrieves from key and counter storage 412 a counter value and a maximum corresponding to the master key identifier it received and compares the counter value to a maximum for the key. If the counter value exceeds the maximum, counter manager 446 so indicates to request manager 430. Otherwise, counter manager 446 increments the counter value and stores the counter value into key and counter storage 412 associated with the key identifier and indicates to request manager 430 that the counter value did not exceed the maximum. At any time, a system administrator with sufficient privileges (e.g. a special operator card associated with the right to make a change to a counter or maximum) may log into counter manager 446 and set or adjust the counter or the maximum for any master key and counter manager 446-stores such maximum value for such key in key and counter storage 412.

When it receives such indication from counter manager 446, if it is an indication that the counter value exceeds the maximum, request manager 430 provides the IP address, port and protocol it received, and an indication that the counter value exceeds the maximum to error manager 434, which describes the error to the device that sent the request containing the permission object as described above.

It is noted that the counter value exceeding the maximum is equivalent to other mechanisms and procedures in which the counter value may exceed the maximum plus a positive or negative offset. Also equivalent is a count down counter that falls below a minimum value such as zero or another value. Also equivalent are embodiments in which the counter value itself may be adjusted, either instead of, or in addition to, the maximum or other threshold.

If it receives an indication that the counter value did not exceed the maximum, request manager 430 provides the specification from the request and the decrypted session key it received to decryption manager 444, which decrypts the data corresponding to the specification in data, fingerprint and session key storage 452 using the decrypted session key, and provides the data to request manager 430. Request manager 430 uses the IP address and port and protocol to build a response containing the decrypted data, and provides it to the device that sent the request via input/output 450 of communication interface 448. If desired, the decrypted data may be encrypted by request manager using the public key of a public key pair for which the recipient has the private key, and in such embodiment, the encrypted data is sent as part of the response instead of the decrypted data. The public key may be sent as part of the request by the requestor. In one embodiment, each request contains a reference and the reference is included with the response.

Encryption.

Data may be encrypted and stored into data, fingerprint and session key storage 452 as described herein as part of the operation of the system of FIG. 4, one embodiment of which will now be described.

Keys and operator cards are received as described above and authorized as described above. Session key generator 460 generates session keys as described above.

Encryption request manager 462 receives encryption requests that include data to be encrypted as described above, and provides the request to encryption manager 464, which requests and receives the session key from session key generator 460, generates the fingerprint of the data to be encrypted as described above (or the fingerprint may be received as part of the request), encrypts the data using the session key, and encrypts the session key and fingerprint using an authorized master key, which it selects as described above or is specified as part of the request. Encryption manager 464 provides the encrypted session key and fingerprint, the encrypted data, and optionally the identifier of the master key to encryption request manager 462, which stores it the encrypted components into data, fingerprint and session key storage 452 optionally indexed by an identifier received as part of the request as described above, and optionally provides the identifier and master key identifier to the source of the request. In one embodiment, encryption request manager 462 signals session manager 460, which generates a new session key if one is required as described above.

External to the system of FIG. 4 are requestors and signors, which are illustrated in FIG. 4 but are not part of the data protection system 400 in one embodiment. Requestor 500 may provide encryption requests or decryption requests to communication interface 448 via input/output 450 and network 470, which may include one or more conventional Ethernet networks and the Internet. Before providing decryption requests, requestor 500 builds a permission object and provides it to one or more signors such as signor 510, which sign the request as described above and return the signature to requestor 500. Requestor 500 includes the one or more signatures with the request as described above, when the request is provided to communication interface 448. Although there are three requestors and three signors, there may be any number of these. Requestors may use some or all of the same signors as other requestors.

What is claimed is:

1. A method of decrypting data, comprising:
receiving, at a computer, a request for data that has been previously encrypted;
determining, by the computer, whether the request has been granted sufficient permission to be decrypted, wherein the request has been granted sufficient permission to be decrypted when the request has at least one signature, and wherein the request has not been granted sufficient permission to be decrypted when the request does not have a signature;
responsive to the request having been granted sufficient permission to be decrypted, the computer:
  decrypting the data, wherein decrypting the data comprises:
    using a first key to decrypt a second key, wherein the second key has been previously encrypted using the first key; and
    using the second key to decrypt the data, wherein the data has been previously encrypted using the second key; and
  providing the decrypted data over a network;
responsive to the request not having been granted sufficient permission to be decrypted, the computer:
  retrieving a counter corresponding to at least one key that is used to decrypt the data and corresponding to an action performed by at least one user; and
  responsive to the value of the counter having a value relative to a threshold value:
    decrypting the data, wherein decrypting the data comprises:
      using the first key to decrypt the second key, wherein the second key has been previously encrypted using the first key, and
      using the second key to decrypt the data, wherein the data has been previously encrypted using the second key;
    providing the decrypted data over the network; and
    adjusting the value of the counter.

2. The method of claim 1, wherein the action performed by the at least one user comprises providing at least one identifier.

3. The method of claim 1, wherein:
the request comprises a fingerprint of the data in non encrypted form;
a version of the fingerprint is stored associated with the data; and
each of the providing the data over the network steps is responsive to the version of the fingerprint matching the fingerprint received with the request.

4. The method of claim 3, wherein:
the version of the fingerprint is stored encrypted using a first key that is used to encrypt one of a plurality of second keys.

5. The method of claim 4 wherein:
the first key is one of a plurality of first keys; and
using the first key comprises identifying the first key from the plurality of first keys responsive to a fingerprint from the request.

6. A system for decrypting data, comprising:
a request receiver having an input operatively coupled for receiving a request for data that has been previously encrypted, the request receiver for providing at least a portion of the request at an output;
a signed request determination manager having an input coupled to the request receiver output for receiving at least some of the at least the portion of the request, the signed request determination manager for making a determination as to whether the request has been granted sufficient permission to be decrypted, wherein the request has been granted sufficient permission to be decrypted when the request has at least one signature, and wherein the request has not been granted sufficient permission to be decrypted when the request does not have a signature and for providing an indication of said determination at an output;
a counter manager having an input coupled for receiving at least one identifier of at least one key that is used to decrypt the data and corresponding to an action performed by a user and coupled to the signed request determination manager, the counter manager for retrieving via an input/output a counter corresponding to the at least one identifier of the at least one key, responsive to the value of the counter having a value relative to a threshold value, adjusting the value of the counter via the counter manager input/output, and providing at an output an indication of the counter having the value relative to the threshold value; and
a decryption manager having an input coupled to the request receiver output for receiving the at least some of the at least the portion of the request and coupled to the signed determination manager output and the counter manager output, the decryption manager for, responsive to: i) the indication of the determination indicating that the request has been granted sufficient permission or ii) the indication of the determination indicating that the request has not been granted sufficient permission and the indication of the counter having the value relative to the threshold value, obtaining via an input/output the data that has been previously encrypted responsive to the at least some of the request received at the decryption manager input, decrypting the data, wherein decrypting the data comprises: using a first key to decrypt a second key, wherein the second key has been previously encrypted using the first key, and using the second key to decrypt the data, wherein the data has been previously encrypted using the second key, and providing the decrypted data at an output coupled to system output.

7. The system of claim 6, wherein the action performed by the at least one user comprises providing at least one identifier.

8. The system of claim 6, wherein:
the request comprises a fingerprint of the data in non encrypted form;
an version of the fingerprint is stored associated with the data and received at the decryption manager input/output; and the decryption manager provides the data additionally responsive to the version of the fingerprint matching the fingerprint received with the request.

9. The system of claim 8, wherein:
the version of the fingerprint is stored encrypted using a first key that is used to encrypt one of a plurality of second keys.

10. The system of claim 9:
wherein the first key is one of a plurality of first keys;
the system additionally comprises a master key identification manager, having an input coupled to the request receiver for receiving a fingerprint from the request, at least one of the plurality of first keys, and the version of the fingerprint, the master key identification manager for identifying at an output the first key from the plurality of first keys responsive to the fingerprint from the request and the version of the fingerprint; and
the decryption manager input is coupled to the master key identification manager output.

11. A computer program product comprising a computer useable medium having computer readable program code embodied therein for decrypting data, the computer program product comprising computer readable program code devices configured to cause a computer system to:
receive a request for data that has been previously encrypted;
determine whether the request has been granted sufficient permission to be decrypted, wherein the request has been granted sufficient permission to be decrypted when the request has at least one signature, and wherein the request has not been granted sufficient permission to be decrypted when the request does not have a signature;
responsive to the request having been granted sufficient permission to be decrypted:
decrypt the data, wherein decrypting the data comprises: using a first key to decrypt a second key, wherein the second key has been previously encrypted using the first key, and using the second key to decrypt the data, wherein the data has been previously encrypted using the second key; and
provide the decrypted data over a network;
responsive to the request not having been granted sufficient permission to be decrypted:
retrieve a counter corresponding to at least one key that is used to decrypt the data and corresponding to an action performed by at least one user; and
responsive to the value of the counter having a value relative to a threshold value:
decrypt the data, wherein decrypting the data comprises: using the first key to decrypt the second key, wherein the second key has been previously encrypted using the first key and using the second key to decrypt the data, wherein the data has been previously encrypted using the second key;
provide the decrypted data over the network; and
adjust the value of the counter.

12. The computer program product of claim 11, wherein the action performed by the at least one user comprises providing at least one identifier.

13. The computer program product of claim 11, wherein:
the request comprises a fingerprint of the data in non encrypted form;
an version of the fingerprint is stored associated with the data; and
each of the computer readable program code devices configured to cause the computer system to provide the data over the network is responsive to the version of the fingerprint matching the fingerprint received with the request.

14. The computer program product of claim 13, wherein:
the version of the fingerprint is stored encrypted using a first key that is used to encrypt one of a plurality of second keys.

15. The computer program product of claim 14 wherein:
the first key is one of a plurality of first keys; and
the computer readable program code devices configured to cause the computer system to use the first key comprise computer readable program code devices configured to cause the computer system to identify the first key from the plurality of first keys responsive to a fingerprint from the request.

* * * * *